(12) United States Patent
Xiong et al.

(10) Patent No.: US 10,166,681 B2
(45) Date of Patent: Jan. 1, 2019

(54) BLUETOOTH SPEAKER AND ROBOT INTERACTION SYSTEM

(71) Applicant: UBTECH Robotics Corp., Shenzhen (CN)

(72) Inventors: Youjun Xiong, Shenzhen (CN); Xiaochu Zhong, Shenzhen (CN); Kai Xu, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 0 days.

(21) Appl. No.: 15/641,232

(22) Filed: Jul. 4, 2017

(65) Prior Publication Data

US 2018/0186008 A1    Jul. 5, 2018

(30) Foreign Application Priority Data

Dec. 31, 2016 (CN) .......................... 2016 1 1263419

(51) Int. Cl.
*H04R 3/00* (2006.01)
*B25J 13/00* (2006.01)
*H04R 1/02* (2006.01)
*B25J 19/02* (2006.01)

(52) U.S. Cl.
CPC ............ *B25J 13/003* (2013.01); *B25J 19/026* (2013.01); *H04R 1/028* (2013.01); *H04R 3/00* (2013.01); *H04R 2420/07* (2013.01); *Y10S 901/01* (2013.01)

(58) Field of Classification Search
CPC ...... H04R 1/028; H04R 3/00; H04R 2420/07; B25J 13/006; B25J 13/003
USPC .................................................... 381/77, 81
See application file for complete search history.

(56) References Cited

U.S. PATENT DOCUMENTS

| | | | |
|---|---|---|---|
| 9,137,602 B2* | 9/2015 | Mayman | G06F 1/1632 |
| 9,544,689 B2* | 1/2017 | Fisher | H04R 5/04 |
| 2004/0044384 A1* | 3/2004 | Leber | A61N 5/0619 607/88 |
| 2004/0136555 A1* | 7/2004 | Enzmann | H04R 25/43 381/314 |
| 2009/0067662 A1* | 3/2009 | Ohguchi | H04R 1/028 381/386 |
| 2014/0270237 A1* | 9/2014 | Wang | G08C 17/02 381/77 |
| 2016/0302286 A1* | 10/2016 | Kim | H04R 3/12 |
| 2018/0070187 A1* | 3/2018 | Drinkwater | G06F 3/165 |

\* cited by examiner

*Primary Examiner* — Disler Paul

(57) ABSTRACT

The present disclosure relates to a Bluetooth speaker, including: an interface unit, a processor, a Bluetooth unit configured to receive and transmit audio signals, and a speaker. One end of the interface unit is configured to connect to a main controller of the robot and another end of the interface unit is configured to connect to the processor. The processor further connects to the Bluetooth unit. The Bluetooth unit connects to the speaker. The present disclosure may be implemented in robots to have more fan and improve user experience.

13 Claims, 6 Drawing Sheets

BLUETOOTH SPEAKER AND ROBOT INTERACTION SYSTEM

CROSS REFERENCE TO RELATED APPLICATIONS

This application claims priority to Chinese Patent Application No. 2016811263419.1, filed Dec. 31, 2016, which is hereby incorporated by reference herein in its entirety.

BACKGROUND

1. Technical Field

The present disclosure relates to speaker field, more particularly to a Bluetooth speaker and a robot interaction system.

2. Description of Related Art

Building block robots adopt main controllers, steering gears, connecting pieces, decorative pieces, and so on to build a variety of postures. Instructions are transmitted via the connection between application (APP) of mobile phone and Bluetooth of main controller to control the steering gears to perform different actions. However, the Bluetooth connection is merely capable of transmitting normal instructions, and is not capable of transmitting audio data, and thus the functions of the robot are limited. The robots may only have splicing function, and cannot provide better user experience.

DETAILED DESCRIPTION

To clarify the purpose, technical solutions, and the advantages of the disclosure, embodiments of the invention will now be described more fully hereinafter with reference to the accompanying drawings, in which embodiments of the invention are shown. The figure and the embodiment described according to figure are only for illustration, and the present disclosure is not limited to these embodiments.

Figure 1:
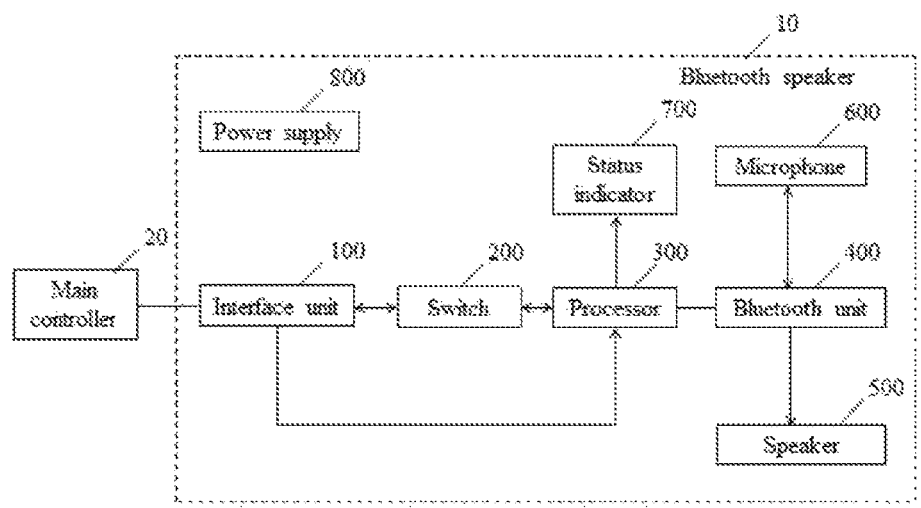
FIG. 1 is a schematic view of a robot in accordance with first embodiment of the present disclosure.

As shown in FIG. 1, a robot 1 of one embodiment of the present invention may include a main controller 20 and a Bluetooth speaker 10. The Bluetooth speaker 10 includes a power supply 800 configured to supply electrical power to other units of the speaker, an interface unit 100 configured for external communication, a switch 200 configured to connect to the interface unit 100, a processor 300 configured to control units within the Bluetooth speaker, a Bluetooth unit 400 configured to receive and transmit audio signals, a speaker 500, a microphone 600, and a status indicator 700.

One end of the interface unit 100 connects to an external port to communicate with the main controller 30 of the robot 1, and the other ends of the interface unit 100 connect to one end of the switch 200 and one end of the processor 300. The other end of the switch 200 connects to the processor 300, such that the processor 300 can confirm turning on the interface unit 100, and the processor 300 may control the switch 200 to connect interface and the processor 300, and conduct a two-way data transmission. The processor 300 connects to the Bluetooth unit 400. The processor 300 further connects to the status indicator 700 to assign Bluetooth address, so as to conduct the two-way data transmission, and to control status indication. The Bluetooth unit 400 further connects to the speaker 500 and the microphone 600 to play and receive the audio signals.

Figure 2:
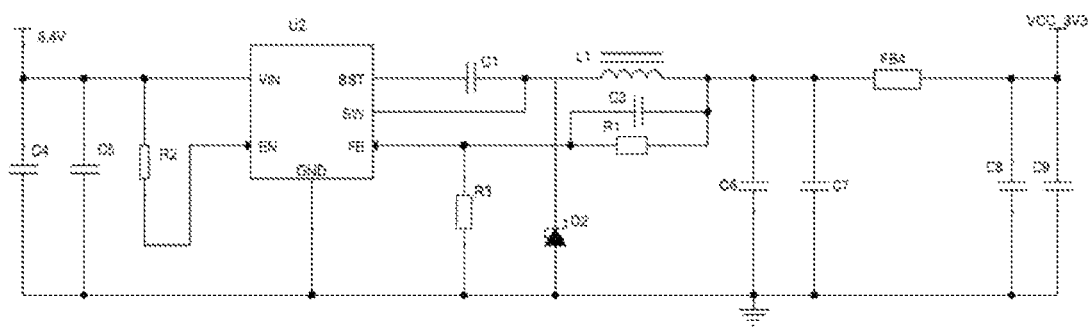
FIG. 2 is a circuit diagram of a power supply in FIG. 1.

As shown in FIG. 2, a power supply voltage at 8.4V is transformed into 3.3V and is transmitted to the switch 200, the processor 300, the Bluetooth unit 400, and the status indicator 700. The power supply 800 includes a power supply module having a fifth enable port, a first input port, and a fourth output port. In one example, the power supply module may be a chip U2. Wherein the fifth enable port may be an EN pin, the first input port may be a VIN pin, and the fourth output port may be a BST pin. The input voltage from the power supply is transmitted to the EN pin of the chip U2 via a resistor R2 and is transmitted to the VIN pin of the chip U2 via a capacitor C4 and a capacitor C5. The voltage is outputted via a SW pin of the chip U2. The input voltage of the power supply is transmitted via the resistor R2 and enables high voltage of the chip U2. The input voltage is filtered by the capacitor C4 and the capacitor C5, and is inputted to the VIN pin of the chip U2. Afterward, the input voltage is outputted and is filtered by a capacitor C6, a capacitor C7, a capacitor C8, and a capacitor C9 so as to output a direct-current (DC) voltage at 3.3V.

Figure 3:
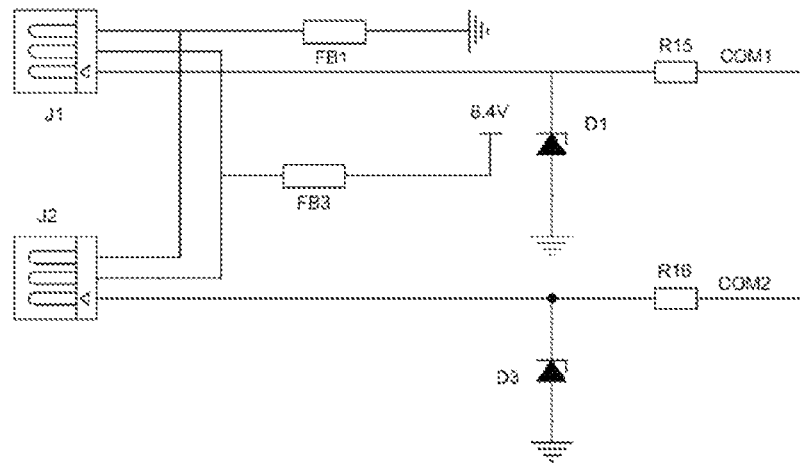
FIG. 3 is a circuit diagram of an interface unit in FIG. 1.

As shown in FIG. 3, the interface unit 100 includes a first interface J1 and a second interface J2. The interface unit 100 may include one or more interfaces depending on the needs. In one example, the interface unit 100 may include one interface, which is single into single out. In another example, the interface unit 100 includes two cascade connected interfaces each connecting to one device. After the first device is turned on and assigned with an identification (ID) number, the next device is turned on and assigned with another ID number. Then, the devices are controlled by broadcast. As such, corresponding positions of the devices numbers may be acquired. When the interface unit 100 includes multiple interfaces, the users may match any devices at will, and may not be limited to a fixed ID, so that interactivity may be improved. The first interface J1 is connected to the switch via a resistance R15, and the second interface J2 is connected to the processor via a resistance R16.

Figure 4:
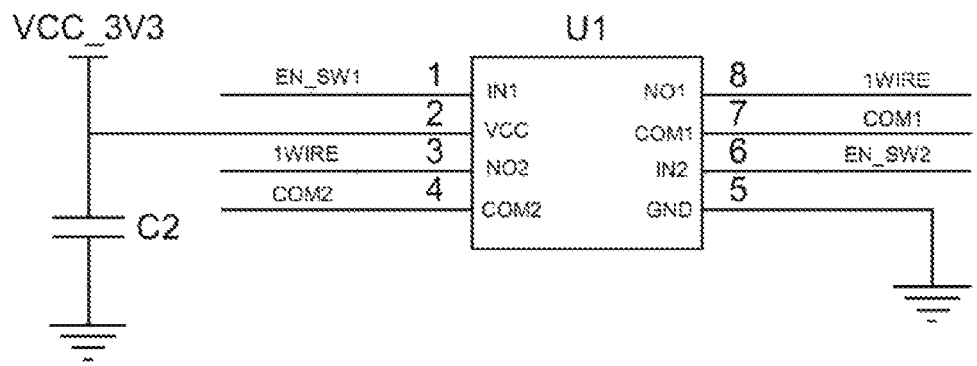
FIG. 4 is a circuit diagram of a switch in FIG. 1.

As shown in FIG. 4, the switch 200 includes a switch module having a first data interface, a second data interface, a first output port, a second output port, a first enable port, and a second enable port. In one example, the switch module may be a chip U1. Wherein the seventh pin and the fourth pin of the chip U1 are the first data interface COM1 and the second data interface COM2, respectively. The eighth pin and the third pin of the chip U1 are the first output port 1WIRE and the second output port 1WIRE, respectively. The first pin and the sixth pin are the first enable port EN_SW1 and the second enable port EN_SW2, respectively. The fourth pin connects to the second interface J2, and the seventh pin connects to the first interface J1. The first pin, the third pin, the sixth pin, and the eighth pin connect to the processor. The processor may turn on the fourth pin and the third pin or turn on the seventh pin and the eighth pin according to a voltage of the fourth pin and the seventh pin. For example, when the seventh pin COM1, i.e., the first interface J1, is at the high voltage, the processor turns on the seventh pin and the eighth pin via the first pin.

Figure 5:
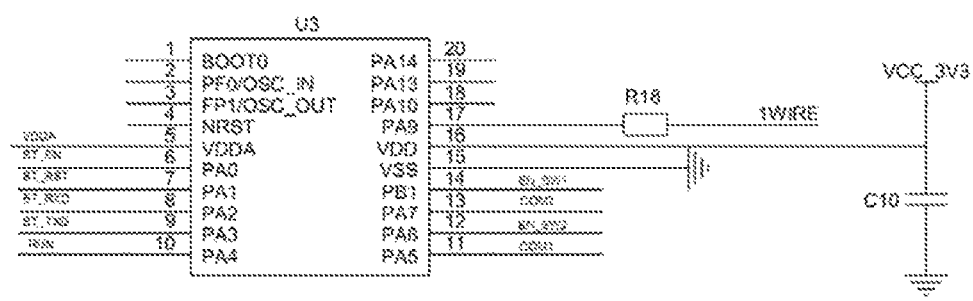
FIG. 5 is a circuit diagram of a processor in FIG. 1.

As shown in FIG. 5, the processor 300 includes a main control module having a third data interface, a fourth data interface, a third output post, a third enable port, a fourth enable port, a first Bluetooth enable port, a first Bluetooth reset port, a first Bluetooth reception port, a first Bluetooth transmission port, and a status indication port. In one example, the main control module may be a chip U3, wherein the eleventh pin and the thirteenth pin connect to the third data interface and the fourth data interface respectively. The seventeenth pin may be the third output port. The twelfth pin and the fourteenth pin connect to the third enable port and the fourth enable port. The sixth pin, the seventh pin, the eighth pin, and the ninth pin connect to the first Bluetooth enable port, the first Bluetooth reset port, the first Bluetooth reception port, and the first Bluetooth transmission port. The tenth pin may be the status indication port. The eleventh pin and the thirteenth pin connect to the interface to turn on one of the first interface J1 and the second interface J2 between the switch and the interface according to the voltage of the eleventh pin or the thirteenth pin. In one example, the twelfth pin or the fourteenth pin outputs a high voltage, and the switch may turn on the first interface J1 or the second interface J2. The seventeenth pin of the processor connects to the third pin and the eighth pin of the switch pin to transmit data, and the processor turns on the fourth pin and the seventh pin to connect to the first interface J1 and connect to the second interface J2, so as to conduct the two-way data transmission process. The sixth pin, the seventh, pin, the eighth pin, and the ninth pin connect to the Bluetooth unit 400 to conduct a Bluetooth address configuration process. The eighth pin and the ninth pin connect to the Bluetooth to transmit and receive the data. The tenth pin outputs the high voltage to drive the status indicator to illuminate and indicate status.

Figure 6:
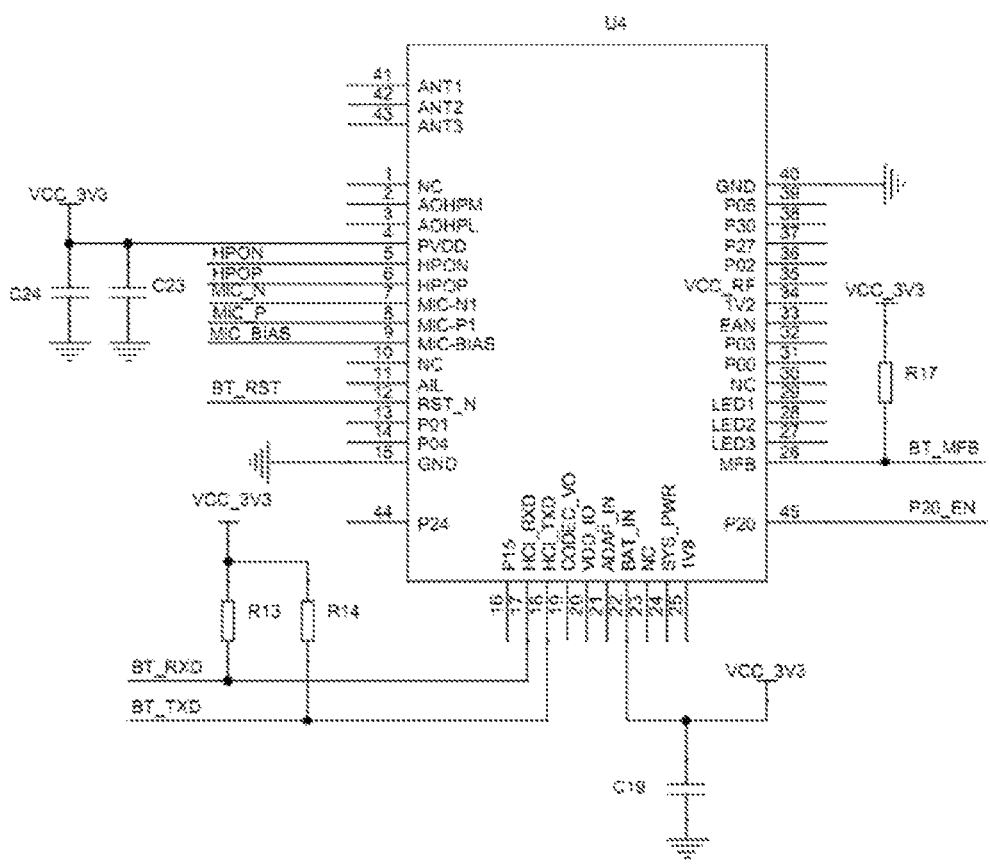
FIG. 6 is a circuit diagram of a Bluetooth unit in FIG. 1.

As shown in FIG. 6, the Bluetooth unit 400 includes a Bluetooth module having a second Bluetooth enable port, a second Bluetooth reset port, a Bluetooth, receive port, a second Bluetooth transmission port, a first audio port, a second audio port, a first audio recording port, a second audio recording port, and a switch port. In one example, the Bluetooth module may be a chip U4, wherein the forty-fifth pin, the twelfth pin, the eighteenth pin, and the nineteenth pin connect to the second Bluetooth enable port, the second Bluetooth reset port, the Bluetooth receive port, the second Bluetooth transmission port respectively. The fifth pin and the sixth pin connect to the first audio port and the second audio port respectively. The seventh pin, the eighth pin, and the ninth pin connect to the first audio recording port, the second audio recording port, and the switch port respectively. The forty-fifth pin, the twelfth pin, the eighteenth pin, and the nineteenth pin connect to the sixth pin, the seventh pin, the eighth pin, and the ninth pin of the main control chip respectively. The fifth pin and the sixth pin connect to the speaker to transmit and play the audio signals. The seventh pin, the eighth pin, and the ninth pin connect to the microphone to receive the audio signals.

Figure 7:
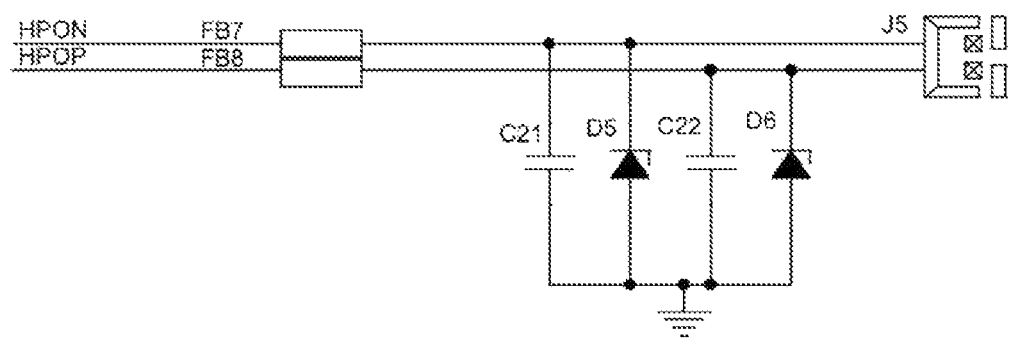
FIG. 7 is a circuit diagram of a speaker in FIG. 1.

As shown in FIG. 7, the speaker 500 includes a speaker J5. The audio signals are outputted via the fifth pin and sixth pin of a Bluetooth chip U4, and the audio signals are inputted to the speaker J5 to conduct an audio transformation process via magnetic beads FB7 and FB8.

Figure 8:
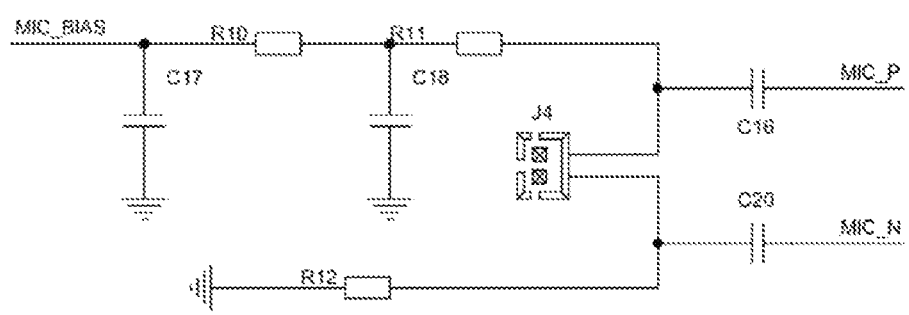
FIG. 8 is a circuit diagram of a microphone in FIG. 1.

As shown in FIG. 8, the microphone 600 includes a microphone J4. Audio resource is transformed into the audio signals via the microphone J4, and the audio signals are transmitted to the Bluetooth unit 400 via a capacitor C16 and a capacitor C20. The microphone is turned on by the Bluetooth, e.g., high voltage level at the ninth pin of the chip U4, to receive the audio signals.

Figure 9:
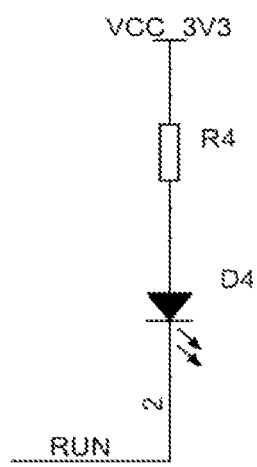
FIG. 9 is a circuit diagram of a status indicator in FIG. 1.

As shown in FIG. 9, the status indicator 700 includes at least one light emitting diode (LED) D4 controlled by the tenth pin of the chip U3. When the tenth pin outputs a low voltage, the LED illuminates.

In view of the above, the Bluetooth speaker 10 in the present disclosure may communicate with the external devices and may transmit the audio signals via the connection of the Bluetooth. The Bluetooth speaker 10 may be implemented in robots to have more fun and improve user experience.

Figure 10:
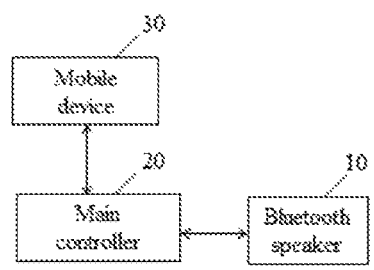
FIG. 10 is a schematic view of a robot interaction system in accordance with second embodiment of the present disclosure.

In another aspect, as shown in FIG. 10, a robot interaction system, including: the main controller 20 of the robot 1 and the Bluetooth speaker 10 connecting to each other by wires. The robot interaction system connects to a mobile device 30 via Bluetooth connection.

The Bluetooth speaker 10 can be installed in the robot 1 and is configured to input the audio signals into the robot 1 and output the audio signals from the robot 1. The microphone 690 within the Bluetooth speaker 10 may receive the audio signals from users and transmit the received audio signals to the main controller 20 of the robot 1 to process the audio signals. The main controller 20 may also output the audio signals and may produce sound via the Bluetooth speaker 10.

Application (APP) of the mobile device 30 operates as an upper layer control terminal of the robot 1. The mobile device 30 connects to the robot 1 via a first Bluetooth wireless connection. The first Bluetooth connection is configured to transmit regular data, such as operation commands, that is, the first Bluetooth connection is not configured to transmit audio data. The mobile device 30 connects the Bluetooth speaker 10 via a second Bluetooth connection such that the audio signals may be transmitted between the Bluetooth speaker 10 and the mobile device 30.

The present disclosure further relates to an operation process described as follow: activating the APP of the mobile device 30 to connect to the robot 1 via the first Bluetooth connection. Upon receiving voltage signals through wire connecting to the Bluetooth speaker 10, the main controller 20 is detected having connection with the Bluetooth speaker 10. The main controller 20 informs the APP of the mobile device 30 through Bluetooth connection. The main control element informs the APP of the mobile device 30 with the name of the Bluetooth speaker 10 via the first Bluetooth connection. The APP of the mobile device 30 may go to a setting interface to connect the second Bluetooth connection, so that the audio signals may be transmitted between the mobile device and the Bluetooth speaker. The microphone within the Bluetooth speaker may transform the recorded sound into the audio signals, and may transmit the audio signals to the Bluetooth. The audio signals may further be transmitted to the APP of the mobile device via the second Bluetooth connection, so as to perform the audio-related function and to communicate with the external devices.

The Bluetooth connections between the mobile device, the robot, and the Bluetooth speaker and the wire connection between the robot and the Bluetooth speaker cooperatively form the interactive system performing the audio-related function by the Bluetooth connections such that the user experience may be enhanced.

It is believed that certain improvements and modifications may be made by those skilled in the art without departing from the principles of the present application, and such improvements and modifications shall be regarded as the scope of the present application.

What is claimed is:

1. A Bluetooth speaker for a robot, comprising:
   an interface unit;
   a processor;
   a Bluetooth unit configured to receive and transmit audio signals; and
   a speaker configured to play the audio signals;
   wherein one end of the interface unit is configured to connect to a main controller of the robot, and another end of the interface unit is configured to connect to the processor; the processor further connects to the Bluetooth unit; and the Bluetooth unit connects to the speaker; the interface unit comprises cascade connected a first interface and a second interface connecting to a first device and a next device respectively; the first interface is configured to turn on the first device; the second interface is configured to turn on the next device, after the first device is turned on and the first device is assigned with an identification number;
   wherein the Bluetooth speaker for the robot further comprises a switch, wherein one end of the switch connects to the interface unit, and another end of the switch connects to the processor;
   wherein the switch comprises a switch module having a first data interface, a second data interface, a first output port, a second output port, a first enable port, and a second enable port;
   wherein the first data interface and the second data interface connect to the first interface and the second interface respectively; the first output port and the second output port connect to the processor; the first enable port and the second enable port connect to the processor; the processor turns on the first data interface and the first output port or turns on the second data interface and the second output port according to a voltage of the first data interface and the second data interface; and
   wherein the first interface is configured to connect to the switch via a resistance by a wire, and the second interface is configured to connect to the processor via a resistance by a wire.

2. The Bluetooth speaker for the robot according to claim 1, further comprising a microphone connecting to the Bluetooth unit.

3. The Bluetooth speaker for the robot according to claim 1, further comprising a status indicator configured to indicate an operation status of the Bluetooth speaker; wherein the status indicator connects to the processor.

4. The Bluetooth speaker for the robot according to claim 1, wherein the processor comprises a main control module having a third data interface, a fourth data interface, a third output port, a third enable port, a fourth enable port, a first Bluetooth enable port, a first Bluetooth reset port, a first Bluetooth reception port, a first Bluetooth transmission port, and a status indication port; wherein the third data interface and fourth data interface connect to the first interface and second interface respectively; the third output port connects to the first output port and the second output port; the third enable port and the fourth enable port connect to the first enable port and the second enable port; the first Bluetooth enable port, the first reset port, the first receive port, and the first Bluetooth transmission port connect to the Bluetooth unit; the status indication port connects to the status indicator.

5. The Bluetooth speaker for the robot according to claim 4, wherein the Bluetooth unit comprises a Bluetooth module having a second Bluetooth enable port, a second Bluetooth reset port, a Bluetooth receive port, a second Bluetooth transmission port, a first audio port, a second audio port, a first audio recording port, a second audio recording port, and a switch port; the second Bluetooth enable port, the second Bluetooth reset port, the second Bluetooth receive port, and the second Bluetooth transmission port connect to the first Bluetooth enable port, the first Bluetooth reset port, the first Bluetooth receive port, and the first Bluetooth transmission port respectively;
   the first audio port and the second audio port connect to the speaker;
   the first audio recording port, the second audio recording port, and the switch port connect to the microphone.

6. The Bluetooth speaker for the robot according to claim 1, further comprising a power supply, wherein the power supply comprises a chip having a fifth enable port, a first input port, and a fourth output port; wherein an input voltage is inputted to the fifth enable port via a current-limiting resistor, and the input voltage is also inputted to the first input port via a filter capacitor; and the input voltage is transformed into an output voltage outputted from the fourth output port.

7. A robot interaction system, comprising:
   a robot;
   a mobile device; and
   a Bluetooth speaker having:
   an interface unit;
   a processor;
   a Bluetooth unit configured to receive and transmit audio signals; and
   a speaker configured to play audio signals;
   wherein one end of the interface unit is configured to connect to a main controller of the robot, and another end of the interface unit is configured to connect to the processor; the processor further connects to the Bluetooth unit; the Bluetooth unit connects to the speaker; the mobile devices connect to the robot and the Bluetooth speaker via an application (APP) of the mobile devices; the interface unit comprises cascade connected a first interface and a second interface connecting to a first device and a next device respectively; the first interface is configured to turn on the first device; the second interface is configured to turn on the next device, after the first device is turned on and the first device is assigned with an identification number;
   wherein the Bluetooth speaker further comprises a switch, one end of the switch connects to the interface unit, and another end of the switch connects to the processor;
   wherein the switch comprises a switch module having a first data interface, a second data interface, a first output port, a second output port, a first enable port, and a second enable port;
   wherein the first data interface and the second data interface connect to the first interface and the second interface respectively; the first output port and the second output port connect to the processor; the first enable port and the second enable port connect to the processor; the processor turns on the first data interface and the first output port or turns on the second data interface and the second output port according to a voltage of the first data interface and the second data interface; and wherein the first interface is configured to connect to the switch via a resistance by a wire, and the second interface is configured to connect to the processor via a resistance by a wire.

8. The robot interaction system according to claim 7, wherein the Bluetooth speaker further comprises a microphone connecting to the Bluetooth unit.

9. The robot interaction system according to claim 7, wherein the Bluetooth speaker further comprises a status indicator configured to indicate an operation status of the Bluetooth speaker; the status indicator connects to the processor.

10. The robot interaction system according to claim 7, wherein the processor comprises a main control module having a third data interface, a fourth data interface, a third output port, a fourth enable port, a first Bluetooth enable port, a first Bluetooth reset port, a first Bluetooth reception port, a first Bluetooth transmission port, and a status indication port; wherein the third data interface and fourth data interface connect to the first interface and second interface respectively; the third output port connects to the first output port and the second output port; the third enable port and the fourth enable port connect to the first enable port and the second enable port; the first Bluetooth enable port, the first reset port, the first receive port, and the first Bluetooth transmission port connect to the Bluetooth unit; the status indication port connects to the status indicator.

11. The robot interaction system according to claim 10, wherein the Bluetooth unit comprises a Bluetooth module having a second Bluetooth enable port, a second Bluetooth reset port, a Bluetooth receive port, a second Bluetooth transmission port, a first audio port, a second audio port, a first audio recording port, a second audio recording port, and a switch port; the second Bluetooth enable port, the second Bluetooth reset port, the second Bluetooth receive port, and the second Bluetooth transmission port connect to the first Bluetooth enable port, the first Bluetooth reset port, the first Bluetooth receive port, and the first Bluetooth transmission port respectively; the first audio port and the second audio port connect to the speaker; the first audio recording port, the second audio recording port, and the switch port connect to the microphone.

12. The robot interaction system according to claim 7, further comprising a power supply, wherein the power supply comprises a chip having a fifth enable port, a first input port, and a fourth output port; wherein an input voltage is inputted to the fifth enable port via a current-limiting resistor, and the input voltage is also inputted to the first input port via a filter capacitor; and the input voltage transformed into an output voltage outputted from the fourth output port.

13. The robot interaction system according to claim 7, wherein the main controller of the robot and the Bluetooth speaker connect to each other by wires, the mobile device connects to the robot via a first Bluetooth wireless connection, and the mobile device connects to the Bluetooth speaker via a second Bluetooth connection.

* * * * *